May 13, 1952 — R. P. DUNMIRE — 2,596,384
FILTER
Filed July 16, 1947
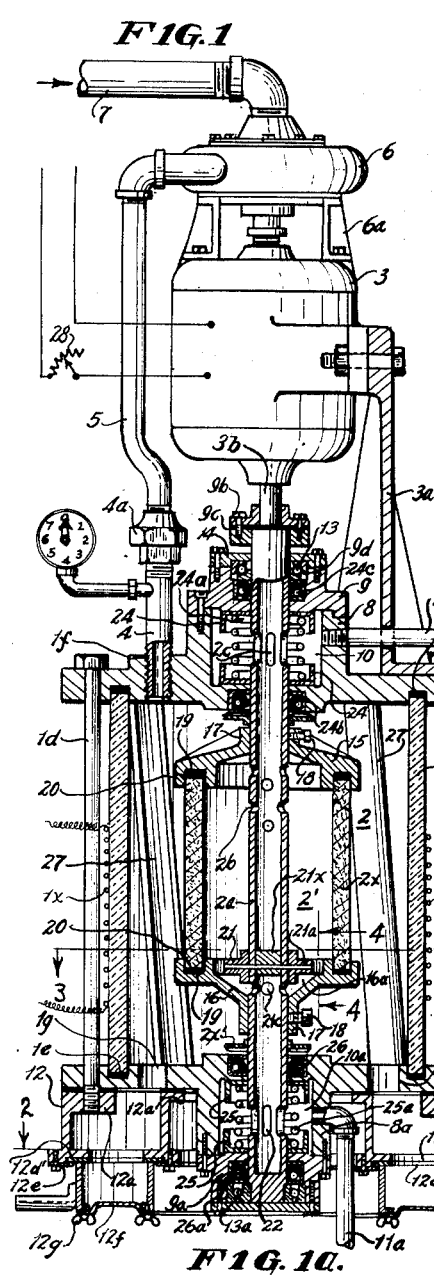
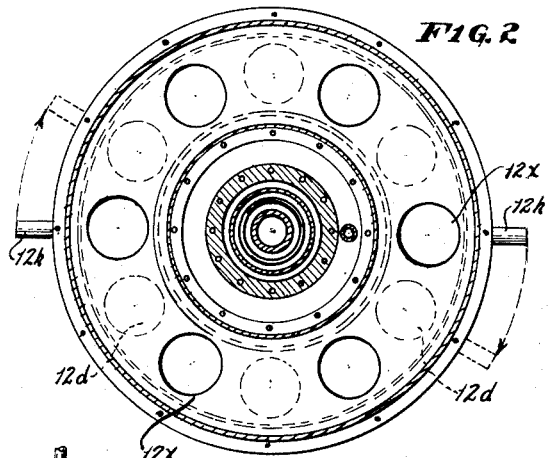
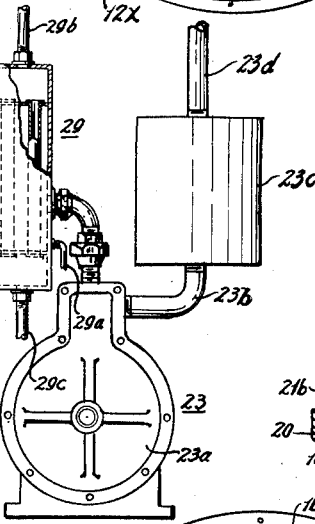
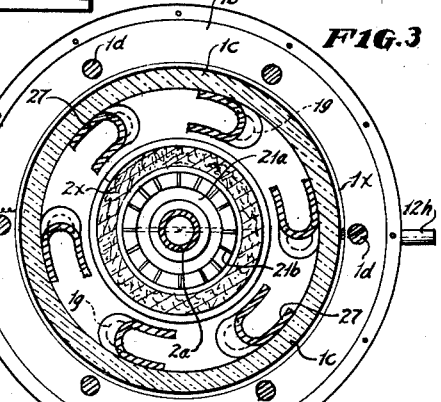
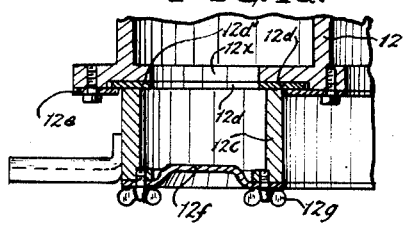
INVENTOR
RUSSELL P. DUNMIRE
BY Geo. B. Pitts
ATTORNEY Patented May 13, 1952

2,596,384

UNITED STATES PATENT OFFICE 2,596,384

FILTER

Russell Paul Dunmire, Orange, Ohio

Application July 16, 1947, Serial No. 761,220

4 Claims. (Cl. 210—64)

This invention relates to an apparatus for and process of treating liquid and semi-liquid materials, which contain light volatiles, gases and solids, adapted to filter the material to remove therefrom solid particles, including micro and macro particles, and to substantially simultaneously separate and remove the gases and low boiling point constituents from the filtrate or liquid portion of the material. In one application of the invention crank case oil may be treated to extract from the oil solids and other foreign matter and to remove low boiling point contaminants in a gaseous phase therefrom. In another application, the apparatus embodying the invention may be interposed in the lubricating oil feed line of an airplane, so that when the latter is maneuvering at high altitudes, and foaming and frothing develops in the oil, due to low atmospheric pressure and the presence of low boiling point and gaseous contaminants and also other impurities such as solid contaminants, including metallic particles, carbonaceous substances and sludges, the oil may be purified of these contaminants and impurities to avoid unsatisfactory engine lubrication. A further application of the apparatus embodying the invention consists in interposing the apparatus in fuel supply lines, especially airplanes, for continuously removing from the fuel, moisture and solid contaminants to eliminate the use of filter cartridges, which are not self cleaning and clog in a relatively short time, and therefore have to be repeatedly replaced. Other types of liquids or liquid materials may be treated; for example, in various chemical treatments where it becomes necessary to remove from the material being treated low boiling point portions and/or solids or it is desirable to recover these substances.

One object of the invention is to provide an improved apparatus of this type wherein liquid containing low boiling point constituents and gases, as well as solids, including micro and macro particles, may be filtered and such substances substantially simultaneously removed.

Another object of the invention is to provide an improved apparatus of this type of relatively simple construction and capable of continuously filtering liquid material and removing therefrom low boiling point constituents, gases, solids and semi-solids.

Another object of the invention is to provide an improved apparatus of this character wherein the supplied material to be filtered is heated and a connection with a vacuum pump or other source of vacuum is interposed between the filtering wall and the discharge outlet for the filtrate, whereby the gaseous constituents of the latter are removed therefrom.

Another object of the invention is to provide an improved process of filtering liquid adapted to simultaneously remove low boiling point portions thereof and gases therein, together with solid and sludge-like contaminants in a continuous manner.

Another object of the invention is to provide an improved filtering process for continuously removing from liquid solids and semi-solids by means of centrifugal agglomeration, counter-centrifugal filtration and flash evaporation of the low boiling point contaminants.

Another object of the invention is to construct an improved filtering apparatus embodying certain improvements in the apparatus shown in my co-pending application Ser. No. 535,062, filed May 11, 1944, now Letters Patent No. 2,442,234, dated May 25, 1948.

Other objects of the invention will be apparent to those skilled in the art to which my invention relates from the following description taken in connection with the accompanying drawing, wherein Fig. 1 is a view, partly in section and partly in elevation, of an apparatus embodying my invention, and capable of carrying out the herein disclosed process.

Fig. 1a is a fragmentary section of parts shown in Fig. 1, enlarged.

Figs. 2 and 3 are sections on the lines 2—2, and 3—3 respectively, of Fig. 1.

Fig. 4 is a fragmentary section on the line 4—4 of Fig. 1.

In the drawings, 1 indicates as an entirety an outer casing to which the material to be filtered is delivered. 2 indicates as an entirety filtering or separating means within the casing 1 and driven by a suitable motor 3, preferably mounted on the casing 1 by means of a bracket 3a, in connected relation to the filtering or separating means to illustrate one form of driving means for the latter.

The filtering or separating means includes a casing 2' having an annular wall 2x which is formed of porous or foraminous material and through which the filtrate flows to effect filtration or separation of the supplied material, this wall being rotated about its axis by the motor 3 (as hereinafter set forth) to establish outwardly thereof a centrifugal force effective to act on those portions of the material (solids and particles) that are to be separated therefrom.

By preference, the filtering wall forms the side wall of the casing 2', which is bodily rotated by the motor 3.

As set forth in my aforesaid co-pending application, the apparatus is adapted to operate on a wide range of materials. Accordingly, the size of the openings in the filtering wall will depend upon the kind or character of material to be filtered, its pressure and the speed of rotation of the filtering wall; also, where the material to be filtered consists of a liquid, the speed of rotation of the filtering wall and the size of the openings therein will depend upon both the viscosity and pressure of the liquid.

The outer casing 1 consists of upper and lower heads 1a, 1b, formed with annular seats for an annular wall 1c and secured together and to the wall 1c by bolts 1d. The opposite ends of the wall 1c engage suitable gaskets 1e provided in the seats, whereby the casing 1 is made liquid tight. Either head or both heads 1a, 1b, may be provided with suitable instrumentalities (not shown), whereby the apparatus may be mounted on a suitable support or frame of a machine depending on the specific application of the apparatus. In the form of construction disclosed the wall 1c is formed of transparent material, such as glass. The head 1a is formed with an inlet 1f, the walls of which are preferably provided with screw threads to receive and mount a nipple 4, removably connected by a coupling 4a to a supply pipe 5, through which the material to be filtered or operated upon is supplied under pressure. In the preferred form of construction, the pipe 5 is connected to the outlet end of a suitable rotary pump 6 supported on brackets 6a which are secured to the casing of the motor 3, the rotor of the pump 6 being drivingly connected to the shaft of the motor 3, whereby one motor is utilized to drive both the inner casing 2' and pump 6. The material to be operated upon is supplied under pressure by gravity or otherwise by a pipe 7 suitably connected to the inlet end or side of the pump 6. The pump 6 being disposed in close relation to the outer casing 1, it insures delivery of the material through the inlet 1f into the casing 1 at adequate pressure to insure flow of the filtered material into the casing 2', whereas the casing 2' is rotated, the effect of which is to establish outwardly thereof a centrifugal force which acts on the heavy and/or solid portions of the supplied material in opposition to the pressure thereof to prevent accumulation of such portions on the filtering wall of the casing 2' and effect outward movement thereof as later set forth. Accordingly, it is advantageous to provide a pump in close relation to the inlet for the casing 1 to insure a uniform supply of the material at the proper pressure thereto. The head 1a is provided with an annular upwardly extending collar 8, which is concentric to the axis of the casing 1 and removably supports a cap 9 to form a chamber 10, for a purpose later set forth, the side wall of the collar being formed with a screw threaded outlet opening to which a discharge pipe 11 (later referred to) is connected. The lower head 1b is provided with a downwardly extending collar 8a, which is concentric to the axis of the casing 1 and provided with a removable cap 9a to form a chamber 10a, for a purpose later set forth, the side wall of the collar being formed with a screw threaded outlet opening to which is connected a discharge pipe 11a leading to a suitable reservoir (not shown). The lower head 1b is formed with one or more openings 1g (six openings 1g in annular arrangement around the collar 8a being shown) through which that portion of the material, which is prevented from filtering through and into the inner casing 2', gravitates or is directed, as later set forth, into an annular collector 12.

By preference, the side walls of the collector 12 are provided with flanges 12a, the outer flange being formed with screw threaded openings, to receive the threaded ends of the bolts 1d, whereby the latter are utilized to secure the collector 12 in position and the heads 1a, 1b, and wall 1c together. As shown, gaskets 12b are provided between the flanges 12a and head 1b to prevent leakage from the casing 1. The bottom wall of the collector 12 is provided with one or more valved drain openings 12x (preferably six openings 12x—see Fig. 2) through which the separated out solids and/or particles may be discharged into a supplemental collector 12c, so that when the collector 12 is full it may be emptied of its contents without stopping the operation of the apparatus. The supplemental collector 12c is of annular shape and its top wall is formed with openings 12d (one for each opening 12x) and adapted to register therewith, respectively, in one position of the supplemental collector 12c. As shown (see Figs. 1 and 1a) the side walls of the collector 12c, at their upper ends are provided with flanges 12d', which are movably supported on and overlap annular plates 12e suitably fixed to the bottom wall of the collector 12, whereby the collector 12c may be rotated to one position to close the valve openings 12x (see Fig. 2) and to another position into registry with the valve openings 12x (see Figs. 1 and 1a) when the collector 12 is to be emptied. The supplemental collector 12c is provided with a removable bottom wall 12f, which is held in position by thumb screws 12g to permit removal of the wall 12f and discharge of the solids and/or particles from the supplemental collector 12c. The supplemental collector 12c is rotated by suitable handles 12h to position the openings 12d into or out of registry with the openings 12x.

The casing 2' comprises the following: 2a indicates a hollow shaft closed at its lower end. The upper end portion of the shaft 2a extends through alined openings formed in the upper head 1a and cap 9 and supported in anti-friction bearings 13, the upper end of the shaft being connected by a coupling 9b to the adjacent end of the shaft 3b of the motor 3. A gasket 9c is interposed between the parts of the coupling 9b to seal the upper end of the shaft 2a. In the arrangement illustrated the upper end of the cap 9 is recessed as shown at 9d to accommodate the anti-friction bearings 13 between it and the shaft 2a, the bearings 13 being secured in position by an annular ring 14, removably bolted to the cap 9. The lower end portion of the shaft 2a extends through alined openings formed in the bottom head 1b and cap 9a and supported in anti-friction bearings 13a, preferably mounted in the cap 9a similarly to the bearings 13. 15, 16, indicate spaced upper and lower heads each having a hollow boss 17 fitting the shaft 2a and removably secured thereto by a set screw 18. The inner faces of the heads 15, 16, adjacent their peripheries, are formed with alined recesses 19 which form seats for the opposite ends of the porous or foraminous wall 2x. It will be understood that the wall 2x may be of any desired thickness and the openings therethrough may be of varying sizes for reasons already set forth.

Where a porous wall is employed, it may be formed of carborundum, carbon, compressed powdered metal, disks, or artificial stone. The seats 19 are preferably annular and the wall 2x is preferably formed of a single section of material shaped in cross section to removably fit the seats 19, whereby the casing 2' is of true cylindrical form, but the invention is not to be limited to a wall of this cross-sectional shape, since the centrifugal force set up due to the rotation of the casing 2' will be effective where this wall is sectional or of some other shape. Suitable gaskets 20 are interposed between the opposite ends of the wall 2x and the bottoms of the seats 19 to prevent leakage of the filtrate from the casing 2'. The shaft 2a, below the head 15, is formed with a plurality of openings 2b, the purpose of which will later be set forth. 21 indicates an impelling member in the lower end of the casing 2' and fixedly related to the shaft 2a and head 16. The member 21 consists of a disk 21a having a hub suitably secured to the shaft 2a and provided on its outer circumferential side wall with inclined blades 21b, the free edges of which engage with and are seated against the inner side wall of the head 16. As the impelling member rotates with the shaft 2a and casing 2', the blades 21b serve to impel a downward flow of the liquid portion of the filtrate in the casing 2'. As shown, the head 16 is conically shaped and cooperates with a plug 21x within the shaft 2a to form a chamber 16a below the impelling member 21 and the shaft 2a is formed with openings 21c to permit flow of the liquid filtrate into the hollow shaft 2a. That portion of the shaft 2a which extends through the chamber 10a is formed with elongated openings 22 to permit flow of the liquid filtrate into the chamber 10a and discharge therefrom through the pipe 11a. That portion of the hollow shaft 2a extending through the chamber 10 is formed with a plurality of elongated outlet openings 2c to provide for the flow of air and/or gases from the casing 2' into the chamber 10.

23 indicates as an entirety an evacuating means consisting of a suitable exhaust pump 23a having an intake to which the discharge pipe 11 is connected and a discharge pipe 23b connected to a suitable liquid and air or gas separator 23c. The pump 23a is driven at a constant speed by a suitable motor (not shown). The evacuating means 23 operates (a) primarily to volatilize the low boiling point constituents contained in the filtrate filtered through the wall 2x into the casing 2' and remove air and/or gases from the casing for discharge through the exhaust pipe 23d and (b) secondarily to provide a reduced pressure in the casing 2' to accelerate the flow of the filtrate through the wall 2x.

Means, indicated as an entirety at 1x, are provided for supplying the necessary amount of heat to the liquid being treated prior to flowing or filtering into the casing 2' or while passing through the latter to provide the latent heat of evaporation to fractionate off the low boiling point constituents of the filtrate, although under some circumstances the heat generated by the friction between the rotating filtering wall 2x and the material being treated will be sufficient for this purpose. The heating means 1x herein shown consists of a suitable resistance coil, coiled around the wall 1c (preferably exteriorly thereof) and connected with a source of electric current supply, which may be regulated in a well known manner.

24 indicates a pair of plates surrounding and closely fitting the shaft 2a within the chamber 10 and engaged by a coiled expansion spring 24a which normally holds the plates in engagement with the bottom wall of the chamber 10 and inner face of the cap 9. 24b indicates a suitable seal mounted in an annular recess formed in the lower side or face of the head 1a and having a spring operated sealing element engaging the shaft 2a to prevent the escape of material in the casing 1, due to pressure or capillary attraction, into the chamber 10. 24c indicates a suitable seal mounted in an annular recess formed in the cap 9 below the bearing 13 and having a spring operated sealing element engaging the shaft 2a to prevent the escape of material in the chamber 10 into the bearing and outwardly therethrough. 25 indicates a pair of plates surrounding the closely fitting the shaft 2a, within the chamber 10a and engaged by a coiled expansion spring 25a which normally holds the plates in engagement with the top wall of the chamber 10a and inner face of the cap 9a. 26 indicates a suitable seal mounted in an annular recess formed in the upper face of the head 1b and having a spring operated sealing element engaging the shaft 2a to prevent the escape of material in the casing 1, due to pressure or capillary attraction into the chamber 10a. 26a indicates a suitable seal mounted in an annular recess formed in the cap 9a above the bearing 13a and having a spring operated element engaging the shaft 2a to prevent the escape of material in the chamber 10a into the bearing and outwardly therethrough.

To divert the material in the casing 1 away from the seals 24b and 26, I provide on the shaft 2a adjacent each of these parts a plurality or set of outwardly extending arms or wings 2x', the revolution of which by the shaft imparts movement to the material outwardly. In the form of construction shown the arms or wings 2x' of each set consist of ridges embossed on a metal disk which is provided with a collar secured to the shaft 2a in any desired manner.

27 indicates a plurality of collecting members, each being preferably U-shape in cross section, uniformly spaced around the inner face of the wall 1c, the outer side portion of each member being secured to the wall 1c in any desired manner, so as to dispose their open ends in opposed relation to the direction of rotation of the casing 2'. By preference, the members 27 extend from end to end of the casing 1 at an angle to its axis and their lower ends are connected to the openings 1g, respectively. The members 27 serve to collect the separated out solids and particles, and to set up therein a centrifugal force counter to that established by the rotating wall 2x, so that these solids and particles or portions thereof agglomerate into larger bodies or masses and to guide them downwardly and also serve to prevent rotative movement of the material (or portions thereof) supplied to the casing 1 due to frictional contact of the rotating casing 2' therewith, as well as set up a turbulence in the material, the effect of which is to accelerate the separation of the solids and particles from the liquid portion of the material. By preventing rotation of the material in the casing 1, the outer surface of the wall 2x of the casing 2' is continuously washed by portions of the material without unduly affecting the flow of the liquid material through the wall 2x due to the pressure of the material supplied to the casing 1.

Operation.—In practicing my invention, the material to be treated is forced under pressure by the pump 6 through the pipe 5 into the casing 1, the liquid portion of the material being forced through the rotating wall 2x into the chamber or casing 2'. As the wall 2x is rotated, a centrifugal force is established outwardly thereof, the effect of which is to repel the solids, particles and sludge-like contaminants outwardly into the collecting members 27, which set up a counter-centrifugal force and cause the solids, particles and constituents to agglomerate into bodies or masses and direct the latter downwardly, due to the inclination of these members, through the openings 1b into the collector 12, from which they may be removed. The liquid and low boiling contaminants therein are heated by the friction of the supplied material with the rotating wall 2x of the casing 2', or by the heating means 1x when found necessary or desirable, to supply the latent heat of evaporation to the filtrate and pass through the capillaries of the wall 2x, which capillaries divide the liquid into fine streams or particles, so that when exposed to or acted upon by the high vacuum in the casing 2', the low boiling point contaminants are immediately volatilized and drawn off by means of the vacuum pump 23a, whereas the evacuated particles of liquid gravitate to and collect in the bottom of the casing 2' whereby they are acted upon by the impelling element 21 and forcibly discharged through the chamber 16a and shaft 2a into the chamber 10a for discharge through the pipe 11a. The intake of air and return flow of the liquid through the pipe 11a may be prevented by means of a suitable low pressure relief valve (not shown) set at a pressure substantially higher than the pressure within the rotating filter casing 2'.

Thus, it will be noted that the steps of separating the solids and particles from the liquid portion of the material, the agglomerating of the solids and particles into masses and discharging them from the casing 1, filtering of the liquid portion of the material, evacuating the gases and low boiling point constituents in the filtrate and discharging the evacuated liquid are carried on continuously and simultaneously. As there is a continuous supply of the material to the casing 1 and a continuous centrifugal force imparted to the heavy or solid portions thereof, the latter are forced outwardly and then downwardly into the collector 12 due to the angular arrangement of the deflectors 27. Accordingly, it will be observed that the filtering wall 2x is automatically maintained free of those portions of the material which would clog or tend to clog the pores thereof, so that the supplied material is rapidly and efficiently filtered; also that the rate of flow or pressure of the supplied material must be regulated or the speed of the casing 2' be regulated so that the centrifugal force established will not prevent the in-flow of material into the casing 2', but will operate effectively upon the heavier and/or solid portions of the material without unduly affecting the flow of the filtrate into casing 2'. In other words, the speed of the casing 2' must be related to or balanced against the pressure of the supplied material. Where the material to be filtered is a liquid, this speed and pressure must be regulated with respect to the viscosity of the material, to insure flow of the liquid or fluid at a predetermined rate and rapid and efficient operation.

The speed of the motor 3 may be regulated by a suitable rheostat 28; also, if desired, a suitable speed change mechanism may be interposed between the motor 3 and pump 6 to meet varying conditions, dependent upon the kind and/or viscosity of the material, to be operated upon.

It will be observed that the type, character or construction of the wall 2x will depend upon the kind of material to be filtered and/or the character or size of the heavy particles or bodies therein. For example, this wall may consist of sheet metal formed with openings of any desired size, wire mesh of any desired screen capacity per square inch.

29 indicates a suitable condenser interposed in the pipe 11 between the gas receiving chamber 10 and the evacuating means 23, wherein the low boiling point vapors are condensed to liquid and discharged through an outlet 29a for collection in any desired manner, whereas the non-condensable vapors flow to the pump 23a and are discharged into the atmosphere through the pipe 23d. Water or other coolant is supplied by pipe 29b to the container 29 and discharged therefrom through the pipe 29c.

No claim is made herein to the subject-matter disclosed in my aforesaid co-pending application and/or my co-pending application Serial No. 738,333, filed Mar. 31, 1947, now abandoned.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In a filtering apparatus, the combination of a substantially liquid tight stationary casing, consisting of upper and lower end walls and a side wall and having a material supply inlet in its upper portion and a discharge outlet in its lower portion, means for supplying the material to be filtered under pressure to said inlet, a separate liquid tight casing rotatably mounted within said stationary casing and consisting of upper and lower heads and a porous side wall through which the liquid portion of the material flows from said stationary casing into said rotatable casing, a hollow shaft extending axially through said rotatable casing and the upper and lower end walls of said stationary casing, means on the outer sides of said end walls for rotatably supporting said shaft, said shaft being connected to the heads of said rotatable casing to rotate the latter when the shaft is driven and closed at its opposite ends, a wall in said shaft adjacent the lower head of said rotatable casing for closing the opening through said shaft to provide a conduit for air and gases extending upwardly through said upper end wall and a conduit for the liquid portion of the filtrate extending downwardly through said lower end wall, the side walls of said shaft being formed within said rotatable casing and above and below said closure wall with inlet openings and between each end wall of said stationary casing and the adjacent supporting means for said shaft with outlet openings, a discharge pipe, an evacuating means for air and gases contained in the material, connections for the flow of air and gas leading from said outlet openings at the upper end portion of said shaft to said evacuating means, connections for the flow of the liquid portion of the filtrate leading from said outlet openings at the lower end portion of said shaft and connected to said discharge pipe, and means for rotating said shaft, whereby the side wall of said rotatable casing, due to rotation thereof, sets up a centrifugal force effective to accelerate the separation of the solids and particles in the supplied material from the liquid portion thereof.

2. An apparatus as claimed in claim 1 wherein said shaft in the plane of said closure wall is provided with an impeller arranged to induce flow of the liquid portion of the filtrate from said separate rotatable casing into said liquid conduit.

3. An apparatus as claimed in claim 1 wherein the lower end wall for said stationary casing within and adjacent its side wall is formed with a plurality of discharge outlets, an annular collector for the material discharged through said discharge outlets is secured to said lower end wall and an supplemental collector is rotatably mounted on the bottom wall of said collector, the walls between said annular collector and said supplemental collector being formed with openings each of which in one wall registers with one of the openings in the other wall in one rotative position of said supplemental collector to permit discharge of the material in the annular collector into said supplemental collector and to prevent discharge of the material into the latter in another rotative position of said supplemental collector, said supplemental collector being provided with a removable wall to permit removal of the material discharged thereinto.

4. In a filtering apparatus, the combination of a substantially liquid tight stationary casing, consisting of upper and lower end walls and a side wall and having a material supply inlet in its upper portion and a discharge outlet in its lower portion, a closed chamber incorporated with and disposed on the outer side of each of said end walls, means for supplying the material to be filtered under pressure to said inlet, a separate liquid tight casing rotatably mounted within said stationary casing and consisting of upper and lower heads and a porous side wall through which the liquid portion of the material flows from said stationary casing into said rotatable casing, a shaft extending through said rotatable casing axially thereof and the upper and lower end walls of said stationary casing and into said chambers and fixed to the upper and lower heads of said rotatable casing and rotatably mounted at its opposite ends in the outer end walls of said chambers, the upper end portion of said shaft being hollow and formed within said rotatable casing with a port through which air and gases in the filtrate in said rotatable casing flow into said shaft and within the adjacent chamber with a port through which air and gases flow into the latter, an evacuating means, connections between the chamber into which the air and gases flow and said evacuating means, a discharge pipe, the lower end portion of said shaft being hollow and formed within said rotatable casing with a port through which the liquid portion of the filtrate flows into the adjacent hollow portion of said shaft and within the adjacent chamber with a port through which the liquid portion of the filtrate flows into the latter, connections between the chamber into which the liquid portion of the filtrate flows and said discharge pipe, and means for rotating said shaft.

RUSSELL PAUL DUNMIRE.

REFERENCES CITED

The following references are of record in the file of this patent:

UNITED STATES PATENTS

| Number | Name | Date |
|---|---|---|
| 702,795 | Holmes | June 17, 1902 |
| 1,026,075 | Coombs | May 14, 1912 |
| 1,799,590 | Kiefer | Apr. 7, 1931 |
| 2,095,470 | Foley | Oct. 12, 1937 |
| 2,103,635 | Palmer | Dec. 28, 1937 |
| 2,442,234 | Dunmire | May 25, 1948 |

FOREIGN PATENTS

| Number | Country | Date |
|---|---|---|
| 245,860 | Great Britain | Jan. 18, 1926 |